Oct. 25, 1938.                    E. MORLOCK                    2,134,571
        DEVICE FOR THE HYDROGENATION OF VEGETABLE OR ANIMAL
            OILS OR FATS, FATTY ACIDS, OR THE LIKE
                      Filed July 27, 1935
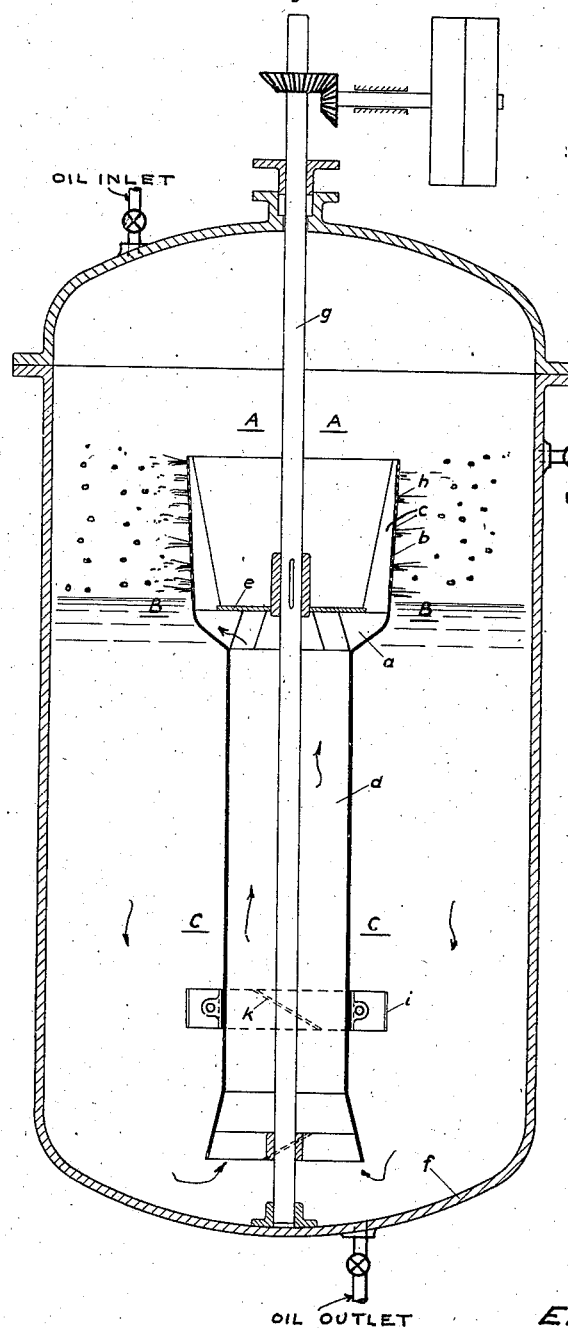
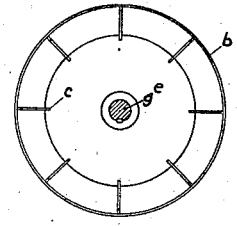
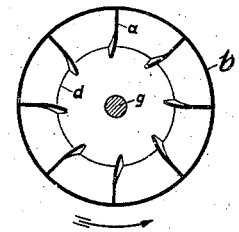
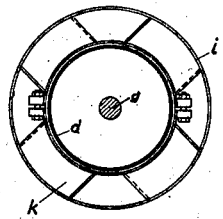
INVENTOR
EMIL MORLOCK
BY
ATTORNEY Patented Oct. 25, 1938

2,134,571

UNITED STATES PATENT OFFICE 2,134,571

DEVICE FOR THE HYDROGENATION OF VEGETABLE OR ANIMAL OILS OR FATS, FATTY ACIDS, OR THE LIKE

Emil Morlock, Frankfort-on-the-Main, Germany, assignor to American Lurgi Corporation, New York, N. Y., a corporation of New York Application July 27, 1935, Serial No. 33,519
In Germany July 27, 1934

9 Claims. (Cl. 87—12)

The invention relates to a device for the hydrogenation of vegetable or animal oils or fats, fatty acids or the like.

For the hydrogenation of vegetable or animal oils or fats, fatty acids or the like it is necessary that the substances to be hydrogenated as well as the catalyzer and the hydrogen are brought into intimate contact at the requisite temperature and pressure. In order to do this it has been customary up to the present either to pass the hydrogen in a finely distributed state through the liquid contained in the hydrogenation vessel, or the substances to be hydrogenated have to be mixed with hydrogen in the gas space of the hydrogenation vessel, for instance in such a manner that the liquid collecting in the lower portion of the hydrogenation vessel is continuously returned into the gas space by means of a pump. In all these known processes the hydrogen or the substances to be hydrogenated have to be circulated by means of special equipment situated outside the hydrogenation vessel.

By means of the present invention it is now possible not only to eliminate these disadvantages but also to obtain considerable advantages with regard to the hydrogenation process proper.

It is the object of the present invention to project the substances to be hydrogenated, which fill the hydrogenation vessel up to a certain level, into the gas space of the hydrogenation vessel by means of an impeller and a distributing device that surrounds this impeller and has for instance a cylindrical or conical shape. This equipment and, if necessary, any additional equipment, for instance an agitator, which is best connected to the equipment, produce a good mixture of the catalyzer with the oil in the hydrogenation vessel proper so that the substances to be hydrogenated are projected into the gas space of the vessel in an intimate and uniform mixture with the catalyzer.

Apart from the fact that the present invention eliminates all circulating devices, which in the known hydrogenation plants are situated outside the hydrogenation vessel, and that the cost of mixing the catalyzer and hydrogen with the substances to be hydrogenated is thereby considerably reduced, the present invention also offers the great advantage that the hydrogenation process can be carried out quickly, at lower temperatures than up to the present, and with a small quantity of catalyzer.

The device according to the present invention consists for instance of an impeller which is fitted to a vertical shaft inside the hydrogenation vessel and which can be constructed on the same lines as the impeller of a centrifugal pump and be turned at a high speed by means of a suitable driving gear. The impeller is surrounded by a shell which rotates with the impeller and which may for instance be of cylindrical or conical shape. The rotary motion of the shell is preferably derived from the impeller by means of a rigid connection between impeller and shell. The mixture of the liquid to be hydrogenated with the catalyzer may be fed to the impeller, for instance through a tube. It leaves the impeller at a high velocity and reaches the inside of the shell that surrounds the impeller. Here it spreads in a thin layer and rises until it is thrown into the gas space of the hydrogenation vessel either through holes in the shell or over the upper rim of the shell. The mixture finally descends in the gas space or runs down on the walls surrounding the latter, unites with the liquid in the lower portion of the hydrogenation vessel, and is then seized again by the projecting device.

The impeller is preferably arranged at the height of the liquid level in the hydrogenation vessel. If the process is worked in such a manner that the liquid level in the hydrogenation vessel varies, it is advisable to arrange the impeller at approximately the lowest liquid level in the hydrogenation vessel, so that it will always be supplied with the necessary quantity of liquid through the suction pipe without requiring any special feeding device in the suction pipe. The shell surrounding the impeller is partly situated in the gas space of the hydrogenation vessel. If the process is carried out in such a manner that the liquid level in the hydrogenation vessel varies, the shell shall suitably be brought up so high as to have its upper rim still situated above the highest liquid level. It is advisable to let the suction pipe rotate as well, which is best done by connecting it either to the impeller or to the impeller shaft. The suction pipe extends so far down into the vessel that there can be no separation of the catalyzer from the liquid in the lower part of the vessel. In order to be absolutely on the safe side in this respect, particularly with regard to large hydrogenation vessels, it is advisable to provide an agitator at the bottom end of the suction pipe. This agitator can for instance consist of inclined plates fitted to the suction pipe.

The projecting device produces on the one hand a very uniform and fine distribution of the liquid and therefore an extremely intimate contact between liquid catalyzer and gas, and on the other hand it permits the quantity of liquid distributed in the gas space always to remain at least approximately constant, even if the liquid level in the hydrogenation vessel varies. The device of the present invention offers the additional considerable advantage that it is extremely simple and safe in operation, as it contains no parts that have a relative motion against one another.

The inside of the shell surrounding the impellers can be provided with guide plates or the like in order to regulate the flow of the liquid. In addition to this, the top portion of the shell can be provided with fine openings, for instance slots, in order to insure a better distribution of the liquid in the gas space. That part of the shell which contains these openings may then preferably be situated above the highest level of the liquid, so that the passage of part of the liquid through these openings is not obstructed.

It is also possible to construct this device in such a manner that the impeller rotates round a horizontal axis. In this case it is generally advisable to arrange several impellers on the horizontal shaft, and these impellers may then be immersed in the liquid to such an extent that their inlet openings are always completely covered by the liquid contained in the hydrogenation vessel. These impellers can likewise be surrounded with shells which discharge the liquid in the desired direction and produce at the same time a fine distribution of the liquid leaving the impellers. With this arrangement it is not absolutely necessary to feed the mixture of catalyzer and liquid to the impeller by means of special pipes.

For the purpose of giving those skilled in the art a better understanding of the invention, the following description will be given in conjunction with the accompanying drawing, in which:

Fig. 1 is a vertical view, partly in section, of a hydrogenating apparatus embodying the principles of the present invention;

Fig. 2 is a horizontal sectional view taken on line A—A of Fig. 1 and having parts in elevation;

Fig. 3 is a similar sectional view taken on line B—B of Fig. 1 and having parts in elevation; and Fig. 4 is a similar sectional view taken on line C—C of Fig. 1 and having parts in elevation.

In Fig. 1, a suitable tank $f$ is provided, in which the hydrogenation of animal or vegetable oils or fats, fatty acids and the like may be carried out. The tank is provided with the usual means for heating the contents and rotating shaft $g$. Mounted in the tank $f$ is the shaft $g$ which is rotated with high velocity by means of the usual pulley, bearing and gear. The usual stuffing box is provided for the proper sealing of the entry of the tank through which shaft $g$ projects. Mounted on the shaft $g$ and rotating with said shaft is an impeller $a$ which is similar in construction to the impeller of a centrifugal pump.

A shell $b$ surrounds the said impeller and may be connected with the impeller to rotate with the impeller. The shell extends axially beyond the impeller less than the attainable delivery height of the impeller and is provided with guide plates or vanes $c$. The relationship of the impeller, the shell and the guide plates or vanes $c$ is readily seen in Fig. 2 in which the top plate of the impeller is designated by the reference character $e$. As indicated in the Figure 2 the guide vanes $c$ extend past the periphery of the plate of the impeller. In the shell $b$ (Fig. 1) are perforations $h$ through which the mixture of material to be hydrogenated and the catalyst are projected in the form of a mist into the atmosphere of hydrogen above the surface of the liquid. The impeller is placed in the tank at such a height that the inlet of the impeller $a$ is below the surface of the liquid and the perforations $h$ in the shell $b$ are above the surface of the liquid. This apparatus for the distribution of the material to be hydrogenated and the catalyst in the form of a mist permits of a very rapid reaction between the hydrogen and the oil and enables the reaction to go more nearly to completion than the methods of the prior art or the apparatus of conventional design. Rigidly connected to the impeller $a$ is a pipe $d$ which serves to feed the material to be hydrogenated to the impeller $a$. In one embodiment of the invention (not shown) this pipe is not used. The pipe $d$ rotates with the impeller $a$ and attached to pipe $d$ is an agitating device consisting of inclined plates $k$ secured to the pipe $d$ and to a concentric ring $i$. This agitator keeps the catalyst in suspension and thoroughly mixed with the oil or fat. The construction of the impeller is similar to that of the impeller of a centrifugal pump and reference to Fig. 3 will show that more clearly. In Fig. 3 the shaft $g$ is indicated and the blades of the impeller $a$ are also shown. The suction pipe is shown as $d$. The shaft $g$ is rotated at high speed thereby imparting great velocity to the material which is sucked through pipe $d$. Since the agitator is secured to the pipe $d$ the material is thoroughly stirred and mixed. The construction of the agitator is shown in detail in Fig. 4 in which the suction pipe is $d$. The concentric ring is indicated by the letter $i$ and the inclined plates by $k$. It is readily seen in Fig. 4 how the ring is attached to the pipe.

The shaft $g$ is arranged inside the closed hydrogenation vessel of well-known design. The shaft carries the impeller $a$ which is firmly connected to the suction pipe $d$. If necessary, it is also possible to provide a connection between suction pipe and shaft in the bottom part of the vessel. The runner is surrounded by the shell $b$. The inside of this shell is fitted with guide plates $c$, and the upper part of the shell is provided with slots $h$. The height of the shell should of course not exceed the attainable delivery height of the runner.

The cover plate $e$ of the impeller is situated approximately at the lowest liquid level, whilst the upper rim of the shell $b$ still extends into the gas space of the vessel, even when the liquid reaches its highest level. The lower end of the suction pipe carries an agitator which may for instance consist of a ring $i$ and four inclined plates $k$ which are connected to both the ring $i$ and the suction pipe $d$.

The method of operation of the present invention and its performance have already been described above in sufficient detail.

I claim:

1. In an apparatus for hydrogenating materials including vegetable and animal oils and fats, fatty acids and the like in the liquid state in the form of globules, spray, droplets, mist and the like as the dispersed phase in a gas containing hydrogen as the continuous phase, the combination comprising a closed reaction vessel adapted to contain a catalyst suspended in a liquid to be hydrogenated in the lower portion and a gas containing hydrogen in the upper portion thereof, a cylindrical pipe rotatably mounted in said vessel, an impeller coaxially mounted in said pipe and adapted to draw said liquid and catalyst upward through said pipe, a top plate partially covering said impeller, a shell coaxially mounted on said impeller, guide-vanes radially arranged in said shell, liquid outlet ports substantially devoid of catalyst in said shell, and means for simultaneously rotating said pipe with said impeller and said shell.

2. In an apparatus for hydrogenating materials including vegetable and animal oils and fats, fatty acids and the like in the liquid state in the form of globules, spray, droplets, mist and the like as the dispersed phase in a gas containing hydrogen as the continuous phase, the combination comprising, a closed reaction vessel adapted to contain a catalyst suspended in a liquid to be hydrogenated in the lower portion and a gas containing hydrogen in the upper portions thereof, a cylindrical pipe having a conical enlargement at the upper end rotatably mounted in said vessel, an impeller coaxially mounted in said conical enlargement of said pipe and adapted to draw said liquid and catalyst upward through said pipe, a top plate partially covering said impeller, a shell coaxially mounted on said impeller, guide-vanes radially arranged in said shell, liquid outlet ports substantially devoid of catalyst in said shell and means for simultaneously rotating said pipe with said impeller and said shell.

3. In an apparatus for hydrogenating materials including vegetable and animal oils and fats, fatty acids and the like in the liquid state in the form of globules, spray, droplets, mist and the like as the dispersed phase in a gas containing hydrogen as the continuous phase, the combination comprising a closed reaction vessel adapted to contain a catalyst and a liquid to be hydrogenated in the lower portion and hydrogen gas in the upper portion thereof, a shaft rotatably mounted in said vessel, a cylindrical member supported by said shaft and rotatable therewith, said cylindrical member having liquid outlet ports substantially devoid of catalyst, an impeller mounted on said shaft within said cylindrical member, said impeller and said cylindrical member being constructed and arranged to cause a flow of said liquid and said catalyst through said cylindrical member and to expel said liquid and catalyst through said outlet ports as globules and mist containing catalyst into said hydrogen gas, and means for rotating said shaft at high speeds whereby an apparatus is provided for hydrogenating materials in the form of globules and mist as the dispersed phase in hydrogen gas as the continuous phase.

4. In an apparatus for hydrogenating materials including vegetable and animal oils and fats, fatty acids and the like in the liquid state in the form of globules, spray, droplets, mist and the like as the dispersed phase in a gas containing hydrogen as the continuous phase, the combination comprising a closed reaction vessel adapted to contain a catalyst and a liquid to be hydrogenated in the lower portion and hydrogen gas in the upper portion thereof, a horizontal shaft rotatably mounted in said vessel, a plurality of impellers mounted in spaced relation on said shaft each of said impellers comprising an inlet plate having a liquid inlet at the center and below the surface of said liquid, a plurality of blades radially mounted on said inlet plate and a cover disk mounted on and partially covering said blades, a shell mounted on each inlet plate and extending past each cover disk, liquid outlet ports substantially devoid of catalyst in each shell, said impellers and said shells being constructed and arranged to cause a flow of said liquid and said catalyst into said shells and to discharge said liquid and said catalyst through said outlet ports in the form of globules, droplets and mist into said hydrogen gas and means for rotating said shaft at high speeds whereby an apparatus is provided for hydrogenating materials as globules, droplets and mist containing catalyst as the dispersed phase in hydrogen gas as the continuous phase.

5. In an apparatus for hydrogenating materials including vegetable and animal oils and fats, fatty acids and the like in the liquid state in the form of globules, spray, droplets, mist and the like as the dispersed phase in a gas containing hydrogen as the continuous phase, the combination comprising a closed reaction vessel adapted to contain a catalyst and a liquid to be hydrogenated in the lower portion and hydrogen gas in the upper portion thereof, a vertical shaft rotatably mounted in said vessel, an impeller mounted on said shaft having the inlet at least below the surface of said liquid, said impeller comprising an inlet plate having a liquid inlet, a plurality of blades radially mounted on said inlet plate and a cover disk partially covering said blades; a shell mounted on said inlet plate and extending beyond said cover disk, outlet ports substantially devoid of catalyst in said shell, said shell and said impeller being constructed and arranged to cause a flow of liquid and catalyst into said shell and to expel said liquid and said catalyst in the form of globules and mist through said outlet ports into said hydrogen gas, and means for rotating said shaft at high speeds whereby an apparatus is provided for hydrogenating materials as globules, droplets and mist containing catalyst as the dispersed phase in hydrogen as the continuous phase.

6. In an apparatus for hydrogenating materials including vegetable and animal oils and fats, fatty acids and the like in the liquid state in the form of globules, spray, droplets, mist and the like as the dispersed phase in a gas containing hydrogen as the continuous phase, the combination comprising a closed reaction vessel adapted to contain a catalyst and a liquid to be hydrogenated in the lower portion and hydrogen gas in the upper portion thereof, a vertical shaft rotatably mounted in said vessel, an impeller mounted on said shaft, said impeller comprising a plurality of inclined blades radially mounted on said shaft below the surface of said liquid and a cover disk partially covering said inclined blades; a shell surrounding said blades and said cover disk, supported by said shaft and rotatable therewith and extending beyond said cover disk in both directions, liquid outlet ports substantially devoid of catalyst in said shell, said impeller and said shell being constructed and arranged to cause said liquid and said catalyst to flow into said shell and to be expelled from said shell as globules and mist containing catalyst through said outlet ports into said hydrogen gas, and means for rotating said shaft at high speeds whereby an apparatus is provided for hydrogenating materials in the form of globules, droplets and mist containing catalyst as the dispersed phase in hydrogen gas as the continuous phase.

7. In an apparatus for hydrogenating materials including vegetable and animal oils and fats, fatty acids and the like in the liquid state in the form of globules, spray, droplets, mist and the like as the dispersed phase in a gas containing hydrogen as the continuous phase, the combination comprising a closed reaction vessel adapted to contain a catalyst and a liquid to be hydrogenated in the lower portion and hydrogen gas in the upper portion thereof, a vertical shaft rotatably mounted in said vessel and adapted to be rotated at high speeds, an impeller mounted on said shaft, and a shell supported by said impeller having liquid outlet ports substantially devoid of catalyst, said impeller and said shell being constructed and arranged to cause a flow of said liquid and said catalyst into said shell and to expel said liquid and said catalyst as globules and mist containing catalyst through said outlet ports into said hydrogen gas whereby an apparatus is provided for hydrogenating materials in the form of globules and mist containing catalyst as the dispersed phase in hydrogen gas as the continuous phase.

8. In an apparatus for hydrogenating materials including vegetable and animal oils and fats, fatty acids and the like in the liquid state in the form of globules, spray, droplets, mist and the like as the dispersed phase in a gas containing hydrogen as the continuous phase, the combination comprising a closed reaction vessel adapted to contain a catalyst and a liquid to be hydrogenated in the lower portion and hydrogen gas in the upper portion thereof, a shaft rotatably mounted in said vessel, means for rotating said shaft at high speeds, a shell surrounding said shaft and rotatable therewith, liquid outlet ports in said shell above the surface of said liquid and means mounted on said shaft within said shell in said liquid and in close proximity of the surface thereof adapted to draw a portion of said liquid and catalyst up into said shell and expel said liquid as globules and mist containing said catalyst through said outlet ports into said hydrogen gas.

9. In an apparatus for hydrogenating materials including vegetable and animal oils and fats, fatty acids and the like in the liquid state in the form of globules, spray, droplets, mist and the like as the dispersed phase in a gas containing hydrogen as the continuous phase, the combination comprising a closed reaction vessel adapted to contain a catalyst and a liquid to be hydrogenated in the lower portion and hydrogen gas in the upper portion thereof, a shaft rotatably mounted in said vessel, means for rotating said shaft at high speeds, a tubular member surrounding said shaft and rotatable therewith, liquid outlet ports substantially devoid of catalyst in said tubular member above the surface of said liquid, inclined blades on the outer periphery of said tubular member below the surface of said liquid and constructed and arranged to maintain said catalyst in suspension in said liquid, and means mounted on said shaft within said tubular member and at least partially submerged in said liquid and constructed and arranged to draw said liquid and said catalyst into said tubular member and expel said liquid and said catalyst as globules and mist through said outlet ports into said gas whereby an apparatus is provided for hydrogenating liquids in the form of globules containing catalyst as the dispersed phase in hydrogen gas as the continuous phase.

EMIL MORLOCK.